US007010426B1

(12) United States Patent
Van Watermulen et al.

(10) Patent No.: US 7,010,426 B1
(45) Date of Patent: Mar. 7, 2006

(54) HIGH-PERFORMANCE SERVER ARCHITECTURE, METHODS, AND SOFTWARE FOR SPATIAL DATA

(75) Inventors: Douglas M. Van Watermulen, Eagan, MN (US); George F. Flannery, Burnsville, MN (US); James D. Scott, Eagan, MN (US)

(73) Assignee: ObjectFX, Minneapolis, MN (US)

( * ) Notice: Subject to any disclaimer, the term of this patent is extended or adjusted under 35 U.S.C. 154(b) by 0 days.

(21) Appl. No.: 10/634,647

(22) Filed: Aug. 5, 2003

Related U.S. Application Data

(63) Continuation of application No. 09/694,117, filed on Oct. 20, 2000, now Pat. No. 6,604,046, which is a continuation of application No. 60/160,561, filed on Oct. 20, 1999.

(51) Int. Cl.
*G01C 21/26* (2006.01)
*G06F 17/00* (2006.01)

(52) U.S. Cl. .................. 701/208; 701/212; 709/203; 709/217; 707/104.1

(58) Field of Classification Search ............... 701/208, 701/212, 200; 717/168, 172, 173, 177; 709/203, 709/212, 213, 217, 218, 219; 707/104.1; 340/995.11, 995.12; 712/225
See application file for complete search history.

(56) References Cited

U.S. PATENT DOCUMENTS

| | | | | |
|---|---|---|---|---|
| 5,543,789 | A | * | 8/1996 | Behr et al. ............. 340/995.12 |
| 5,774,668 | A | | 6/1998 | Choquier et al. |
| 5,796,634 | A | | 8/1998 | Craport et al. |
| 5,951,694 | A | | 9/1999 | Choquier et al. |
| 5,966,135 | A | | 10/1999 | Roy et al. |

(Continued)

FOREIGN PATENT DOCUMENTS

EP 0828367 3/1998

(Continued)

*Primary Examiner*—Tan Q. Nguyen
(74) *Attorney, Agent, or Firm*—Schwegman, Lundberg, Woessner & Kluth, P.A.

(57) ABSTRACT

Systems that distribute map data and related map services are vital to companies in many industries, for example, telecommunications, trucking, and national defense. These systems typically comprise a computer, known as a server, which retrieves the map data, and a computer, known as a client, which electronically requests and receives map data from the server over a computer network, such as the Internet. Servers in these systems often suffer from at least two problems: first, the slow delivery of the map data and related services to clients, and second, the inability to operate in different modes with different types of clients. Accordingly, the inventors devised servers, systems, and related methods for rapidly delivering map data to many types of client, ranging from mobile telephones and personal digital assistants to workstations. To support multi-modal operations with at least two clients, an exemplary system includes a map server having two or more client-mode software modules or programs that govern how the server interacts with the clients. The first client, using an appropriate network address, links to the first program and receives a copy of several mapping objects, enabling the first client to provide certain map functions independent of the server. The second client links to the server using a different network address and receives proxy mapping objects, instead of the actual mapping objects, enabling the second client to work with the server to provide the map functions. The exemplary system also implements client-side and server-side caching of map data, and expandable map service pools, all promoting rapid delivery of map data and services.

16 Claims, 2 Drawing Sheets

U.S. PATENT DOCUMENTS

| | | | |
|---|---|---|---|
| 5,995,107 A | 11/1999 | Berteig et al. | |
| 6,012,098 A | 1/2000 | Bayeh et al. | |
| 6,105,067 A | 8/2000 | Batra | |
| 6,107,961 A | 8/2000 | Takagi | |
| 6,167,441 A * | 12/2000 | Himmel | 709/217 |
| 6,237,092 B1 | 5/2001 | Hayes, Jr. | |
| 6,240,360 B1 * | 5/2001 | Phelan | 701/208 |
| 6,292,743 B1 * | 9/2001 | Pu et al. | 701/202 |
| 6,298,356 B1 | 10/2001 | Jawahar et al. | |
| 6,314,114 B1 | 11/2001 | Coyle et al. | |
| 6,337,693 B1 * | 1/2002 | Roy et al. | 345/619 |
| 6,643,778 B1 * | 11/2003 | Nakazawa | 713/201 |

FOREIGN PATENT DOCUMENTS

| | | |
|---|---|---|
| JP | 10260851 | 9/1998 |
| JP | 10282879 | 10/1998 |
| JP | 11015839 | 1/1999 |
| WO | WO-99/41675 | 8/1999 |

* cited by examiner

HIGH-PERFORMANCE SERVER ARCHITECTURE, METHODS, AND SOFTWARE FOR SPATIAL DATA

RELATED APPLICATION

This application is a continuation of U.S. patent application Ser. No. 09/694,117, which was filed on Oct. 20, 2000, now U.S. Pat. No. 6,604,046, which is a continuation of U.S. Provisional Application 60/160,561 which was filed on Oct. 20, 1999. These applications are incorporated herein by reference.

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright©1999, ObjectFX Corporation.

TECHNICAL FIELD

The present invention concerns servers and related methods for handling map or spatial data.

BACKGROUND

The use of digital map or spatial data is vital to the success of companies in many industries. For example, telecommunications companies use spatial data to locate bottlenecks and breakdowns in telephone networks; trucking companies use it to determine optimal routing of their tractor-trailer trucks; and even the United States Army uses it to manage troop deployments and supply operations for national defense.

As recently as ten years ago, most of the computer products that made it possible to use map data were specialized, stand-alone computer systems with specialized mapping (map-data-handling) software running on the same computers that store the map data. The mapping software generally allowed users to interact with displayed maps by, for example, zooming on specific map regions. Though useful, these computer systems, known as single-tier systems, were both expensive to purchase and expensive to operate. Indeed, their expense put them beyond the reach of many businesses.

More recent years witnessed the emergence of two-tier mapping systems using new component-based mapping software and computer networks. Two-tier mapping systems comprise at least two computer systems: The first one, known as a server, stores and manages the map data, and the second one, known as a client, communicates with the server through a computer network, allowing the client to electronically request and receive map data from the server. The computer network generally takes the form of a local-area network, such as corporate intranet, or a wide-area network, such as the Internet. The World Wide Web portion of the Internet, in particular, has allowed any browser-equipped computer to act as a client to any Internet-connected map server. Indeed, today there are many map servers that the public can access. Examples include www.mapquest.com, www.mapblaster.com, and www.mapinfo.com.

One problem with servers in two-tier map systems is the length of time they force clients, and more importantly, users of clients, to wait for map data. Conventionally, this wait arises in two ways, depending on whether a client is a "thick" client or a "thin" client. For thick clients—that is, clients that desire mapping software for handling map data—servers download (or copy) the mapping software to the clients before they send any map data. However, downloading this software to clients can sometimes take several minutes.

For thin clients—clients that lack the mapping software—servers skip the step of downloading the mapping software to speed delivery of requested map data. However, without the mapping software, these thin clients can generally only display static versions of the map. This means, for example, that to zoom in or out on a current display of a map, the client must request further map data from the map server and wait for the map server, potentially located anywhere in the world, to receive the zoom request, perform the necessary calculations, and then finally send an updated map image reflecting the desired zooming. Thus, thick clients force users to wait for the downloading of mapping software, and thin clients force users to wait for the server to handle requested functions, such as zooming.

In addition to this waiting problem, conventional servers in two-tier map systems also suffer from design inflexibilities. For instance, these servers are programmed to either treat all clients as thin clients by not allowing them to host the mapping software or all clients as thick clients by forcing them to host the mapping software. This means, for example, that servers geared for thick clients are unable to service thin clients, such as mobile telephones or personal-digital assistants, which have little memory capacity or little tolerance for significant waits.

Accordingly, there is a need for better servers and better ways of handling the communication and manipulation of map data over computer networks.

SUMMARY

To address these and other related needs, the present inventors devised unique map servers, map systems, and related methods for communicating and handling map data to a variety of client types, ranging from mobile telephones and personal-digital assistants to workstations, with reduced wait times for users. An exemplary system includes a map database, a map server, and at least two clients, a thin one and a thick one. The map server includes at least two programs or software modules: a first one for transferring mapping software in the form of mapping objects, and a second one for transferring proxy mapping objects representing the mapping objects. The first client, using an appropriate network address, links to the first program and receives a copy of the mapping objects, enabling the first client to execute certain map functions, for example, zooming, without the server. The second client links to the second program using a different network address and receives the proxy mapping objects, instead of the actual mapping objects, enabling the second client to work with the server to execute certain map functions. Thus, the exemplary system supports both thin and thick clients, and indeed a range of client thickness through provision of additional network-addressable software modules.

Additionally, the exemplary system implements client-side and server-side caching to accelerate response to client requests. An exemplary client-caching scheme entails having the map server answer map requests with not only the requested map, but also with additional related maps and storing the additional related maps in the client cache, in effect anticipating further map requests. Thus, in response to some user requests for further map data, for example, in response to a zoom command, the client computer retrieves the data from the client cache rather than requesting the data from the map server. An exemplary server-caching scheme caches the map data requested by two or more clients, reducing the time necessary to serve the cached map data to subsequent clients.

Other notable features of the exemplary system include a web server between the clients and the map server. The exemplary web server provides a pool of persistent network connections to the map server to reduce time for initiating connections and thus to promote rapid response to map requests. Additionally, the map server includes a service dispatcher for appropriately distributing client requests across expandable sets of service pools, with each service pool including two or more functionally identical service objects for executing a particular map service. Exemplary services include map-data-access services, geocoding services, street-routing services, map-image-display services, and even custom user-defined services. The service pools are configurable to expand in response to demand criteria and thus to dynamically scale the map server to meet changing demands for map data and services.

DETAILED DESCRIPTION OF EXEMPLARY EMBODIMENTS

The following detailed description, which references and incorporates the drawings, describes and illustrates one or more exemplary embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
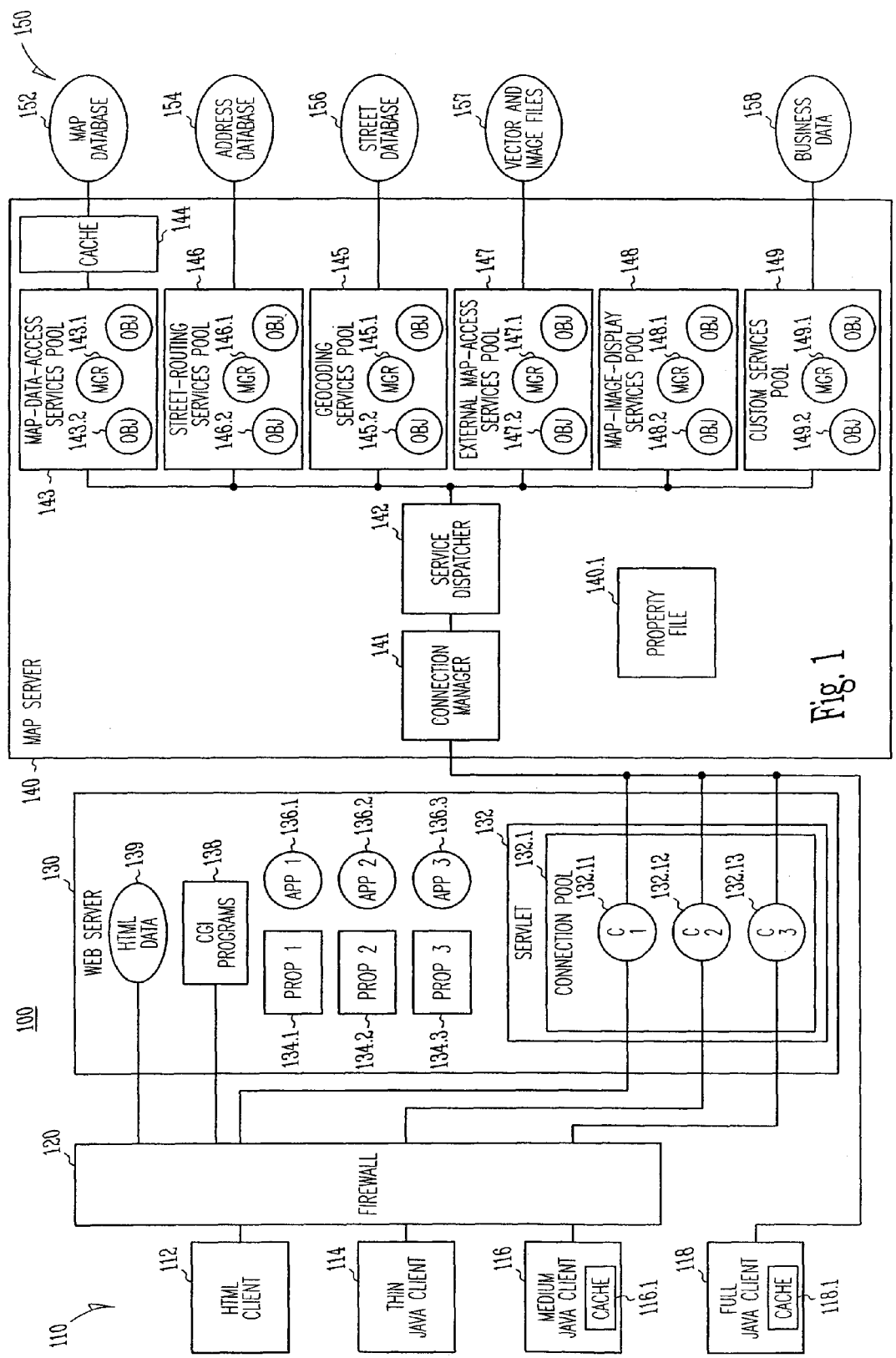
FIG. 1 is a block diagram of an exemplary multi-tiered spatial-data system 100 incorporating teachings of the present invention.

FIG. 1 shows an exemplary multi-tiered spatial-data system 100 incorporating teachings of the present invention. The broken lines in the figure indicate that various components of the system are interconnected permanently or temporarily via a wired or wireless wide-area-network, such as the Internet, or a wired or wireless local-area networks, such as a corporate Intranet. Notably, system 100 not only supports simultaneous connection to a variety of client types, but also includes a set of features, which separately and collectively promote rapid delivery of spatial or map data and map-related services to clients.

In particular, system 100 includes a set of multi-weight clients 110, a fire wall 120, a web server 130, a spatial-data (or map-data) server 140; and a set of map-related databases 150. More particularly, multi-weights clients 110 include clients 112, 114, 116, and 118, which can span the gamut of devices from workstations, laptop computers, and personal computers to portable, handheld devices such as cell phones and personal digital assistance (PDAs.) Indeed, the scope of the invention encompasses any communications device capable of presenting map information.

Client 112, which runs a markup language, such as hypertext markup language (HTML) and which is representative of one type of Internet client, displays GIF-formatted map images. This client generally supports very little map interactivity, because of low processing power or slow network connection. Client 114, a thin-weighted Java client representative of another type of Internet client, displays maps in the form of Java Images. Client 116, a medium-weight Java client representative of an intranet client, processes and displays map data formatted as Java vectors. Client 118, a full Java client, processes and displays, map data also in the form of Java vectors. Client 118 bypasses web server 130 with a direct socket connection to map server 140. Clients 112, 114, and 116 are connected through firewall 120 to a servlet 132 of web server 130.

Clients 116 and 118 include respective map-related caches 116.1 and 118.1. These caches allow storage not only of previously requested map data, but also storage of anticipatory map data. For these clients map data is provided in the form of Java vectors. Storage of previously requested map data allows rapid redisplay of maps even if end-users are interacting with layers, or if some of the layers are displaying dynamic data such as moving vehicles. The exemplary system processes changes to map layers "top down", and then redisplays the map layers "bottom up." This enables clients in the exemplary system to redraw only map layers that have changed and to redisplay unchanged layers directly from cache. The size of the cache can be controlled to suit your needs or to operate within the limits of end-user computers.

In addition to servlet 132, web server 130, which has an associated uniform resource locator, includes property files 134.1, 134.2, 134.3; applets 136.1, 136.2, and 136.3; common-gateway-interface (CGI) programs 138; and HTML (webpage) database 139. Property files 134.1–134.3, each of which has an associated URL, define the respective client types, or weights, of clients 112, 114, and 116. In this exemplary embodiment, the root portion of the property-file URLs includes the URL for web server 130; however, in other embodiments, the root portion of these URL are distinct from the web-server URL.) The property files (text files in the exemplary embodiment) include references to respective applets or software modules 136.1–136.3, which ultimately govern the set of actual and/or proxy objects loaded onto clients addressing the web server through the respective URLs. Appendix A shows an exemplary property file 134.

In some embodiments, one or more of the applets, such as one intended for a thin Internet client, include a remote-method-invocation (RMI) object that enables or otherwise facilitates the use of proxy objects, or more precisely communication between the proxy objects and their counterparts within the server. This allows clients that lack a particular form of Java to function properly with the proxy objects. For example, some Microsoft Internet Explorer browsers are written in a Java language, which does not support remote-method invocation as do other Java languages. (Microsoft and Internet Explorer are believed to be trademarks of Microsoft Corporation.) These Internet Explorer browsers would not be able to serve as thin clients without deployment of an RMI object. In some cases, this RMI object is a custom RMI object that provides only essential communication functions and thus lacks some functionality of the RMI object native to some Java languages.

One or more of the software modules contains caching software, for example, in the form of objects, enabling the establishing and maintaining of map-related caches, such as caches 116.1 and 118.1 in clients 116 and 118. Servlet 132 includes a FIFO-based connection pool 132.1 comprising a set of one or more persistent socket connections 132.11, 132.12, and 132.13 to map server 140. (Although only three are shown, the exemplary embodiment can be configured to includes any number of connections.) Map server 140 includes a property file 140.1, a connection manager 141, a service dispatcher 142, a map-data-access services pool 143, a shared map-data cache 144, a geocoding-services pool 145, a street-routing-services pool 146, an external-map-access-services pool 147, a map-image-display-services pool 148, and a custom-application-services pool 149.

Connection manager 141 is coupled to socket connections 132.11–132.14. All client requests and corresponding responses feed through the connection manager, with the connection manager functioning in a handshaking capacity. Each socket connection essentially represents a thread through the map server. The connection manager also monitors the number of connections against a maximum number of connections set in the map-server property file 140.1 (which is described below in greater detail.) Thus, if connection pool 132 attempts to open a new connection because none of its present connections are available for use, the connection manager can prevent opening of the new connection depending on whether the maximum number of connections are already open. Related, some embodiments of the invention monitor the use of existing connections, closing those that have been inactive for too long as measured against a parameter in property file 140.1. This monitoring function can be placed within the connection manager or in another object or software module.

Operatively coupled to connection manager 141 is service dispatcher 142. Service dispatcher 142 receives all requests received by connection manager 141 and routes them to one or more of the appropriate service pools. 143–149.

Service pools 143–149 include service pool managers 143.1–149.1 which distribute service requests across respective instances of service objects 143.2–149.2 (Note that the exemplary embodiment follows an object-oriented approach; however, for clarity, the description generally omits "object" from the names of objects.) Moreover, each service pool can be deployed on its own dedicated processor to facilitate scaling. The architecture of the server supports the dynamic growth of each service pool to meet the demand of client requests.

In particular, map-data-access services pool 143 use relational database technology (such as ObjectFX's Spatial Index and Metadata formats and software) to access map objects from any of relational database management system (RDBMS) in the form of vector layers and/or raster images. (Exemplary RDBMSs include MS Access, SQL Server, Sybase, Oracle) Requests for this service include parameters such as viewing extent, map scale, map center, and the layers to be presented. These parameters are converted to SQL queries sent through JDBC connections to access and retrieve data from the RDBMS. Some embodiments use multiple JDBC connections for better performance and scalability.

In addition, this service can also directly access spatial data held in specially formatted files. Data from these files is still presented to the user as interactive vector objects separated into layers. There are many formats supported by this option, including DXF, DWG, VPF, VMAP, ESRI Shape, MapInfo MID/MIF, and more.

Shared map-data cache 144 is connected between map data access services pool 143 and map database 152. As each client requests map data from the map database, that data is held in shared cache 144 on the machine executing the map server. For example, if the first user in the morning starts zooming and panning around New York, then all of the data for New York will be added to this server cache. When the next user requests New York data, they will be accessing it from RAM (random-access memory), rather than from a cold database retrieval. This reduces the access time. Size of this shared cache can be set through the property file for the map server. For many spatial databases, 100 to 200 MB of RAM is sufficient to hold all of the map data, thereby promoting fast map displays for many users.

The exemplary cache (and related control software) addresses three key factors to increase server performance during heavy usage. First, the cache is shared between multiple instances of the spatial data access service (that is, query session.), allowing the various spatial-data-access-service instances to access previously retrieved map data (index cells) from local server memory rather than from the data and thus promoting faster responses.

Second, in the exemplary embodiment, the cache has a maximum size limit set or configured by the map server property file during setup or initialization of the map server. This limit is generally based on the capacity of the computer system hosting the map server and what else that system is being used for. Some embodiments adjust the limit dynamically, but usually this is not generally necessary.

Third, the exemplary cache provides two algorithms for displacing cached index cells when the cache is full and a new index cell needs to be brought into memory. The first incorporates a LRU (least recently used) model to force unused or dormant index cells out of the cache. The second is based on spatial proximity, and keeps cells (data or objects) which are closest to those objects in the current spatial query (e.g. map viewing window). Property settings are used to select which of the two algorithms controls the cache.

Geocoding-services pool 145 offers the capability of parsing a common street address and determining corresponding latitude and longitude coordinates. Exemplary vendors who specialize in this capability include Matchware and Sagent (formerly QMS.) This service can be used on-the-fly to receive street addresses and return coordinates which can then be used for a variety of application functions. For example, an end-user might want to enter a home or destination address, and have the map pan to that location. A more complex use sends multiple addresses to this service and requests a map displaying all of the locations. In these examples, the results of the geocoding service would be combined with the map-data-access service to create a map composed of "address dots" in combination with other map layers.

Street-routing services 146 are used typically in combination with the geocoding service to determine optimal routes between two or more locations. RouteSmart Technologies Inc. is a vendor for one suitable routing engine. However, other embodiments use other routing engines. This service can be used on-the-fly to receive end-user (or programmatic) input, calculate optimal routes, and send the result to other services for client display.

External map access services 147 allow the display of spatial data contained in a variety of geospatial formats. It is typically used to display raster data such as that produced by imaging satellites. The data accessed through this service can be combined in a layered display with data retrieved from a database. Exemplary formats supported by this option, include GeoTIFF, ADRG, CADRG, SPOT, DOQ, and CIB. This service can also display surface data from DTED files.

Map-image-display services 148 are used by non-vector clients to generate map displays as GIF or Java Images. Map objects retrieved from relational databases, or other on-the-fly map sources, are composed into images that can be sent to HTML pages or thin applets for display.

Custom-services pool 149 evidences an open interface for the development and incorporation of new services into the map server architecture. In the exemplary embodiment, the custom services can be written in Java, C, C++, or other languages as long as there is an API that can be accessed through JNI. Exemplary uses of this capability include insertion of application logic or algorithm services within the exemplary server structure or algorithm services. Insertion of application logic is especially useful for very thin client deployments where the client is barely more than a display and selection environment. By building the logic or rules of an application as a map-server service, these thin clients can appear to offer a wide range of functionality. Examples of algorithm services include point-to-point routing, just-in-time inventory calculations, supply-chain optimizations, or battlefield simulations.

The various services and other elements of the exemplary server architecture are independent of the particular map data to be used or map-related services to be performed. This allows an exemplary map server to provide high performance access to a unified set of services. With the custom-services interface, anyone may extend the set of map-related services supported by the exemplary server with her own custom service.

Additionally, map server 140 includes a property file 140.1 which governs certain aspects of its operation. When the map server is initiated, service-pool managers are created as directed in property file 140.1 Each service pool manager then creates two or more instances of that particular service, with the property file governing how many instances are created. The property file also selects and/or controls the caching algorithm of cache 144. Appendix B shows an exemplary property file 140.1.

Although not shown in the Figure, some embodiments provide the map server with an administrative utility that permits control over various aspects of the map server's operation through modification of property file 140.1. The administration utility includes its own point-and-click interface that can be used while the map servers is running. It allows you to view performance statistics, and to modify individual services as the server is running and bottlenecks are observed.

Map-related database 150 includes a relational map database 152, an address database 154, a street database 156, an external-map database 157, and a business database 158. that stores data in the form of related tables. In other embodiments, map-related database 152 includes one or more flat-file databases, relational databases, and/or object-relational databases. Map data is stored in a variety of formats as vector data or raster image data in flat-file data sets, indexed flat-file data sets, and in relational database tables. The exemplary server allows total freedom for the selection and use of geographic data. It can access data stored in relational databases along with data accessed from common vector and raster formats such as ESRI Shape Files, MID/MIF, DXF, or government formats such as VPF, DTED, and CADRG.

The exemplary embodiment imposes a spatially oriented indexing mechanism on the storage of map data to promote rapid logical access. This indexing scheme groups map data spatially for storage and access from our database. Index cells are the units of storage, collecting a group of spatially close map objects. This indexing scheme facilitates movement of map data as blobs in and out of the spatial database.

Some embodiments deploy the web server and the map server on the same computer and use additional hardware to run their relational databases.

The exemplary map server is written entirely in Java, and can be deployed on Windows NT and UNIX platforms. The use of Java means that the map server is composed of Java objects that are capable of receiving and responding to object messages. For Java application clients, these messages are carried directly from the clients to the map server through socket connections. However, for applet clients, these messages are sent through HTTP communications to the servlet in the form of query strings. These query strings are also object-to-object messages, but the use of HTTP allows them to safely pass through firewalls.

Exemplary System Operation

Figure 2:
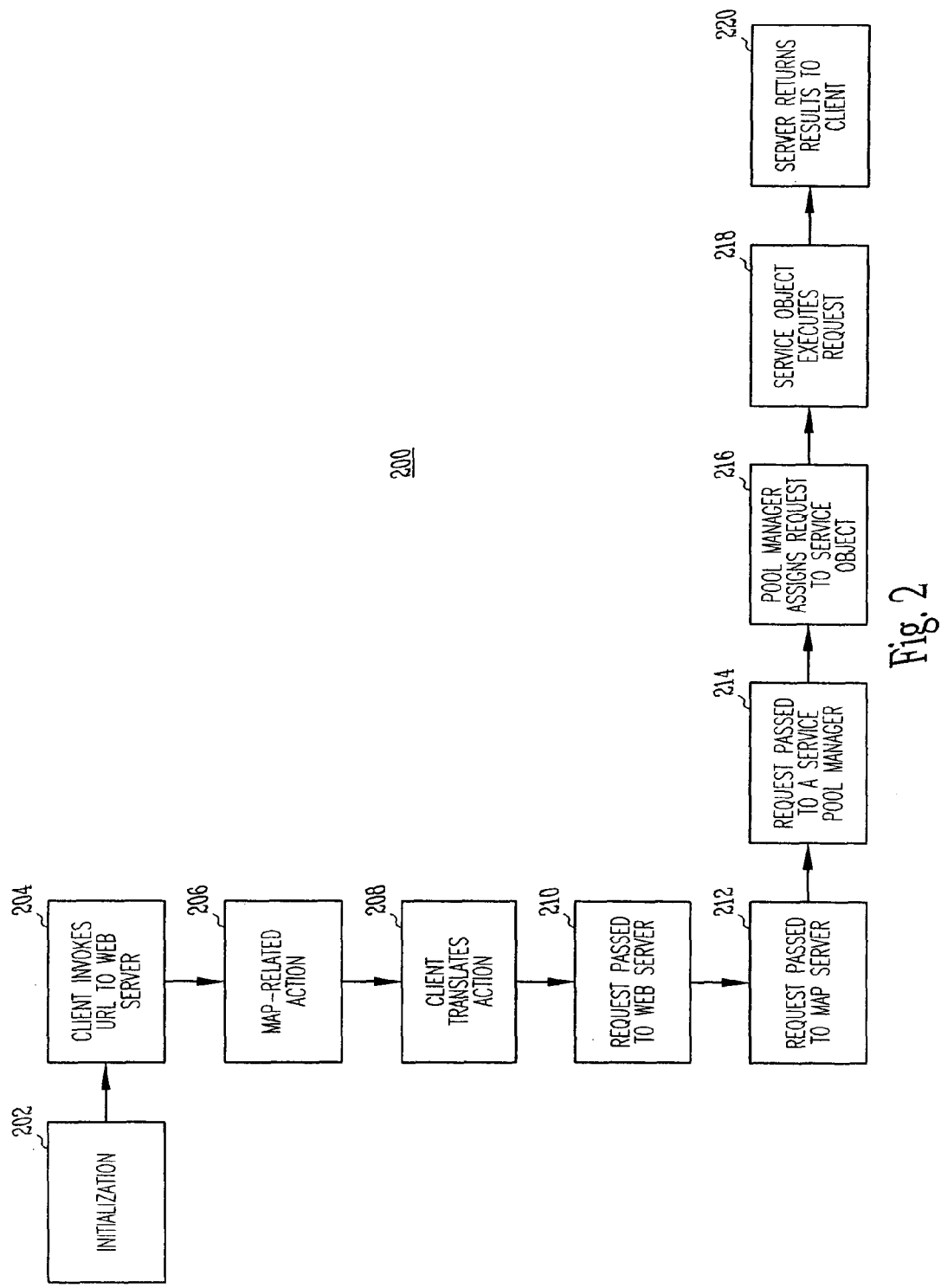
FIG. 2 is a flowchart illustrating an exemplary method of operating the system of FIG. 1.

FIG. 2, which shows an exemplary flowchart 200, illustrates an exemplary method of operating system 100. Flow chart 200 includes blocks 202–220, which are executed serially in this exemplary embodiment. However, other embodiments of the invention may change the order of execution and/or execute two or more blocks in parallel using multiple processors or a single processor organized as two or more virtual machines or subprocessors. The exemplary system implements various portions of the system in an object-oriented programming language such as Sun Microsystems Java 1.1.7B or 1.2.2 or as Enterprise Java Beans (EJBs.) Moreover, still other embodiments implement the blocks as two or more specific interconnected hardware modules with related control and data signals communicated between and through the modules. Thus, the exemplary process flow is applicable to software, firmware, and hardware implementations.

The exemplary method begins at block 202, with initialization of web server 130 and map server 140. In the exemplary embodiment, this entails creation of property files 134.1, 134.2, and 134.3 and property file 140.1. Execution then proceeds to block 204.

In block 204, at least one of clients 112–116 invokes a URL, connecting the client through firewall 120 to web server 130. The URL designates one of property files 134.1–134.3, and thus establishes the "weight" or "thickness" of the client from the perspective of web server 130. More precisely, in response to invocation of one of the property-file URLs, web server 130 deploys a corresponding one of applets 136.1–136.3 to the invoking client. The applets include a set of predetermined objects and/or proxy objects which ultimately governs the client-side versus server-side location of map-related functionality. Execution of the exemplary method then advances to block 206.

In block 206, a user initiates a map-related action through a browser or other application running on the client (that is, a client application.) Exemplary map-related actions include asking for point-to-point directions or for display of a specific regional map.

At block 208, the client application on the client translates the map-related action into one or more service requests for map server 130. In the exemplary embodiment, the client application uses the actual object, a proxy object, or a standard string formatting to translate the request. The choice of translation method depends on the property file associated with the client-invoked URL.

Notably, the use of query strings means that almost any other "body" of code can make use of services provided by the map server. For example, web sites utilizing CGI can make direct requests of the map server by passing parameterized query Strings through sockets. These will typically request maps in the form of GIF images, though they could potentially make use of other spatial query services. Code written in other languages can also format query strings and use sockets to request services of the map server. Sites using Java can use the servlet to receive query strings through HTTP, and pass those on to the map server through multiple socket connections.

The proxy object appears to the client as the actual, remote service object on the server system; however, its function differs. The proxy object first creates a remote method request targeted at the remote service object and then sends it to the web server. The remote method request is generally the same request that the application made of the proxy object. However, when the client application requests collections of coordinate data from the map server, the proxy object combines several individual requests into an aggregate request. The aggregate request is sent to the server instead of sending several individual requests.

Requests that are formulated into the standard string format, known as a query string, are passed along to the web server using application specific means, without use of proxy objects. In this case, it is the responsibility of the application to use defined keywords and values in a string to express the nature of the service request being made.

When a client request is for collections of coordinate data, which it will use at the client system, then an aggregate query is used in the request. This architectural feature recognizes the performance cost of many small requests across the communications network, so instead, combines the many small requests into a single, large, aggregated request or query.

Block 210 entails communicating the one or more requests to web server 130. For Internet communication between the client and the web server, the proxy object in the exemplary embodiment uses the hypertext transfer protocol (HTTP) and sends the remote method request to the web server, specifically the servlet. Execution continues at block 212.

In block 212, the web server or more precisely the servlet passes the one or more requests to the map server. In the exemplary embodiment, this entails use of the first available open connection in connection pool 132 of web server 130. Use of an open connection from the connection pool avoids performance losses stemming from opening and closing a new connection to the map server for every request. (Note that the exemplary embodiment allows some clients, such as client 118, to use a separate connection to the map server. The use of this connection outside of the connection pool is transparent to the map server.)

Connection manager 142 receives the one or more requests from the web server. and then passes the received requests to service dispatcher 142. (If the request is a query string, the connection manager forwards the string to a query-string processor (not shown) which reformulates the string into a remote method request.)

In block 214, the service dispatcher passes the request to one of the service-pool managers for service pools 143–149. Execution continues at block 216.

In block 216, the service manager that received the requests invokes the first available service instance or object to perform the request as indicated in block 220.

Block 218 entails execution of the request by the invoked service instance. For example, if the request were for specific map data, the pool manager for map-data-access-services object within services pool 143 would query cache 144 for the specific data. If cache 144 lacked the requested map data, obtaining the requested data would entail querying database 152. Once the service object receives the search result, it outputs a response object, which varies depending on the service.

Block 220 entails returning the results in the form of a response object to the client. This entails passing the response object back along a thread through the map server to the requesting client. More precisely, the response propagates back through the service pool manager, through the service dispatcher and connection manager and connection pool to the client.

When a client issues a request for map data that makes its way to the map-access-services pool, the request in the exemplary embodiment arrives as an aggregate set of classes of spatial data (such as, local roads, parks, and hospitals) within a geographic area. However, the map-data-access object in the service pool that handles the request collects all the index cells for each class of data that spatially intersect that geographic area into an aggregate response greater than that actually requested. As with other responses, the data is stored in the server-side cache. For clients that have client-side caches the aggregate response is passed onto the client, with the client placing the all the data in its cache, and displaying what was originally requested. The extra data provided in the cache can then be used to satisfy relevant requests without requesting the server. However, for clients that lack a local cache, the aggregate response is trimmed back to meet only their original requests, with the extra data remaining in server-side cache. (Some embodiments provide a webserver cache which allows even further performance advantages.)

The exemplary server architecture supports a chaining mechanism for distribution of server functions to other servers by allowing any map-related service within one server to actually be configured as a client of another map server. The chaining mechanism allows an originating or master server to uses a proxy object of the dispatcher to distribute requests to another remote server, called a slave server.

The exemplary server architecture allows for separate instances of the server to be chained together. This chaining feature supports separating map-related services onto different machines, thus distributing the resource demands. The chaining mechanism entails use of proxy service objects within the service pools. Although invoked or selected like other instances of a service within a service pool, each proxy service object routes its request to a corresponding service instance on a different machine, designated by a URL in the property file for the map server.

APPENDIX A

Exemplary Embodiment of Property File for Web Server

```

#    Client Execution

ofx.executionMode=Client

#    Basic Vector Client Settings

ofx.queryRequestID=Query
ofx.geocodingRequestID=Geocoding
ofx.externalMapRequestID=ExternalMap
ofx.serviceDispatcherInterface=com.ofx.server.SxServiceDispatcherProxy
ofx.queryInterface=com.ofx.query.SxQuerySessionProxy
ofx.geocodingInterface=com.ofx.geocoding.SxGeocodingSessionProxy
ofx.routingInterface=com.ofx.geocoding.SxOfxRoutingSessionProxy
ofx.externalMapInterface=com.ofx.dataAdapter.pro-
```

APPENDIX A-continued

Exemplary Embodiment of Property File for Web Server

```
ducer.pmi.SxPmiMapSessionProxy

#    Connection To Server

ofx.server.name=123.45.67.89
ofx.server.port=2222

#    Map Display Controls

ofx.enableMapBackground=true
ofx.declutterLabelLimit=1000
ofx.primitive.foreground=true
ofx.backgroundRGBRed=51
ofx.backgroundRGBGreen=204
ofx.backgroundRGBBlue=255

#======================================================
#                END OF FILE
```

APPENDIX B

Exemplary Embodiment of Property File for Map Server

```

#    Basic Server Settings

ofx.executionMode=Server
ofx.server.port=2222
ofx.vulture.interval=3000000
ofx.connection.timeout=86400
ofx.connection.timeout=0
ofx.spatialCacheSize=30000000
ofx.serviceDispatcherInterface=com.ofx.server.SxServiceDispatcher
ofx.queryInterface=com.ofx.query.SxQuerySession
ofx.routeCacheLogIntervalSecs=86400
ofx.license.filename=./license.dat

#    Administration service

ofx.begin
ofx.groupName=AdminService
ofx.groupType=ServiceDefinition
ofx.requestID=AdminService
ofx.receiverClass=com.ofx.server.SxAdminService
ofx.maxServices=1
ofx.adminService.userName=admin
ofx.adminService.password=admin
ofx.maxIdleTime=30
ofx.end

#    General Map Display Controls

ofx.imageConverter=com.ofx.base.SxGeoGifConverter
ofx.enableMapBackground=false
ofx.declutterLabelLimit=1000
ofx.percentExtraDeclutter=25
ofx.useShields=Both
ofx.iShield.hiScale=3000.0
ofx.usShield.hiScale=543.99
ofx.stShield.hiScale=68.0
ofx.primitive.foreground=false
ofx.primitive.background=false
ofx.backgroundRGBRed=0
ofx.backgroundRGBGreen=0
ofx.backgroundRGBBlue=123

                            ofxServer.properties
# Query Service (access spatial data)

ofx.begin
ofx.groupName=Query
ofx.groupType=ServiceDefinition
ofx.requestID=Query
ofx.receiverClass=com.ofx.query.SxQuerySession
```

APPENDIX B-continued

Exemplary Embodiment of Property File for Map Server

```
ofx.maxServices=1
ofx.dbType=XFile
ofx.dbName=file://localhost/D:/wms/Data/wmsDB
ofx.end

#    Map Image Service

ofx.begin
ofx.groupName=LargeMapImage
ofx.groupType=ServiceDefinition
ofx.requestID=LargeMapImage
ofx.receiverClass=com.ofx.ms.server.MsMapService
ofx.maxServices=1
ofx.service.timeout=120
ofx.queryRequestID=Query
ofx.queryInterface=com.ofx.query.SxQuerySessionProxy
ofx.externalMapInterface=com.ofx.dataAdapter.pro-
ducer.pmi.SxPmiMapSessionProxy
ofx.mapName=wms
ofx.mapWidth=600
ofx.mapHeight=400
ofx.imageConverter=com.ofx.base.SxGeoGifConverter
ofx.end

#    Geocoding Service

ofx.begin
ofx.groupName=Geocoding
ofx.groupType=ServiceDefinition
ofx.requestID=Geocoding
ofx.receiverClass=com.ofx.geocoding.address-
broker.SxAbGeocodingSession
ofx.maxServices=1
#ofx.service.timeout=120000000
#ofx.addressBroker.firewallProxy=
CORRECT_ENTRY_NEEDED_HERE
ofx.addressBroker.serverURL=http://ciol.centruscio.com/cgi-bin/abcgi.exe
ofx.addressBroker.userName=ObjectFX
ofx.addressBroker.password=gcB4IKUO
                            ofxServer.properties
ofx.addressBroker.encryptionKey=
EMW3R04J6CGCSKQNQ3JGAU2HEE
ofx.end

# Routing Service

ofx.begin
ofx.groupName=Routing
ofx.groupType=ServiceDefinition
ofx.requestID=Routing
ofx.receiverClass=com.ofx.routing.objectfx.SxOfxRoutingSession
ofx.maxServices=1
ofx.service.timeout=120
ofx.networkName=mnTravNet
ofx.queryRequestID=Query
ofx.queryInterface=com.ofx.query.SxQuerySessionProxy
ofx.routing.classes=LAHwy,MajHwy,MinHwy,Ramp,LocRoad
ofx.end

#======================================================
#                END OF FILE
```

CONCLUSION

In furtherance of the art, the present inventors have presented unique map systems and methods for communicating and handling map data with reduced wait times for users. The exemplary system communicates with clients of variable weight, implements client-side and server-side caching, maintains a pool of persistent socket connections, creates and expands map-related service pools, and allows distribution of service pools to other processors. Teachings of the present invention may also be applicable to other types of data servers, for example image servers, or any type of data server where rapid delivery is desired.

The embodiments described above are intended only to illustrate and teach one or more ways of practicing or implementing the present invention, not to restrict its breadth or scope. The actual scope of the invention, which embraces all ways of practicing or implementing the concepts of the invention, is defined only by the following claims and their equivalents.

The invention claimed is:

1. A system for serving map data and map related services over a computer network to two or more clients, the system comprising:
   a server associated with at least first and second URLs, wherein the first URL is invokable by at least one of the clients to cause the server to interact with the one client as a first type of map client having a first weight or thickness; and wherein the second URL is invokable by at least another of the clients to cause the server to interact with the other client as second type of map client having a second weight or thickness that differs from the first weight or thickness; and
   a map server including:
      a first map service pool having two or more first map service objects or instances for answering requests from the clients for a first map service; and
      a second map service pool having two or more second map service instances for answering requests from the clients for a second map service; and
      means for establishing and maintaining a pool of two or more persistent network connections between the web server and the map server.

2. The system of claim 1:
   wherein the first URL is associated with an applet that comprises at least one executable or compilable map related object for a first map operation and at least one proxy for another executable or compilable map related object for a second map operation; and
   wherein the second URL is associated with a second applet that comprises at least one executable or compilable map related object for the first map operation and at least one executable or compilable map related object for the second map operation.

3. The system of claim 2, further comprising a wireless client which has invoked the first URL and a non-wireless client which has invoked the second URL.

4. The system of claim 3, wherein the wireless client includes a mobile telephone.

5. The system of claim 1:
   wherein the first map service pool provides geocoding services and the second map service pool provides street routing services; and
   wherein the first map service pool provides one of map data access services, geocoding services, street routing services, external map access services, and map image display services.

6. The system of claim 5, wherein one or more of the first map service objects or instances is a proxy for a corresponding first map service object or instance within a machine different from that hosting the map server.

7. The system of claim 6, further comprising a map database coupled to the map server.

8. The system of claim 1, wherein the one client is an HTML client and the other client is a JAVA client.

9. A system for serving map data and map related services over a computer network, the system comprising:
   a server associated with at least first and second URLs;
   a wireless client operatively coupled to receive map data from the server after invoking the first URL; and
   a non-wireless client operatively coupled to receive map data from the server after invoking the second URL;
   wherein invocation of the first URL causes the server to provide the wireless client at least one proxy object for a may operation; and
   wherein invocation of the second URL causes the server to provide the non-wireless client an executable or compilable object for the map operation.

10. The system of claim 9, further comprising:
   a map server coupled to the server and including:
      a first map service pool having two or more first map service objects or instances for answering requests from the clients for a first map service; and
      a second map service pool having two or more second map service instances for answering requests from the clients for a second map service; and
   means for establishing and maintaining a pool of two or more persistent network connections between the server and the map server.

11. The system of claim 10, wherein the wireless client includes a mobile telephone.

12. A system for serving map data and map related services over a computer network, the system comprising:
   a server for serving map data;
   a wireless client operatively coupled to receive map data from the server; and
   a non-wireless client operatively coupled to receive may data from the server;
   wherein the wireless client includes at least one proxy object for a map operation, and the non-wireless client includes an executable or compilable object for the map operation.

13. A method of distributing map data through a common server and over a communications network to a wireless client including a mobile telephone and to a non-wireless client, the method comprising:
   communicating a first map related applet to the wireless client in response to the wireless client connecting to the common server;
   communicating a second map related applet to the non-wireless client in response to the non-wireless client connecting to the common server;
   receiving respective first and second requests for map data from the wireless client and the non-wireless clients; and
   responding to the respective first and second requests in first and second different ways based on differences in the first and second clients, with responses to the requests including map data from a common map database;
   wherein the first map-related applet includes at least one proxy object for a may operation; and the second map-related applet includes an executable or compilable object for the map operation.

14. The method of claim 13, wherein the wireless client includes a mobile telephone or a personal digital assistant.

15. The method of claim 13, wherein the first map-related applet is referenced in a first property file that is associated with a first URL, and the second map-related applet is referenced in a second property file that is associated with a second URL.

16. The method of claim 15, wherein the first and second URL are associated with the server.

* * * * *

UNITED STATES PATENT AND TRADEMARK OFFICE
CERTIFICATE OF CORRECTION

PATENT NO. : 7,010,426 B1
DATED : March 7, 2006
INVENTOR(S) : Van Watermulen et al.

It is certified that error appears in the above-identified patent and that said Letters Patent is hereby corrected as shown below:

Column 1,
Line 12, below "reference." insert -- COPY RIGHT NOTICE AND PERMISSION --.

Column 14,
Lines 12, 37 and 65, delete "may" and insert -- map --.

Signed and Sealed this

Sixth Day of June, 2006

JON W. DUDAS
*Director of the United States Patent and Trademark Office*